Jan. 23, 1968     A. L. NASVYTIS     3,365,254
MULTI-ROLLER HIGH SPEED BEARING
Filed July 29, 1965
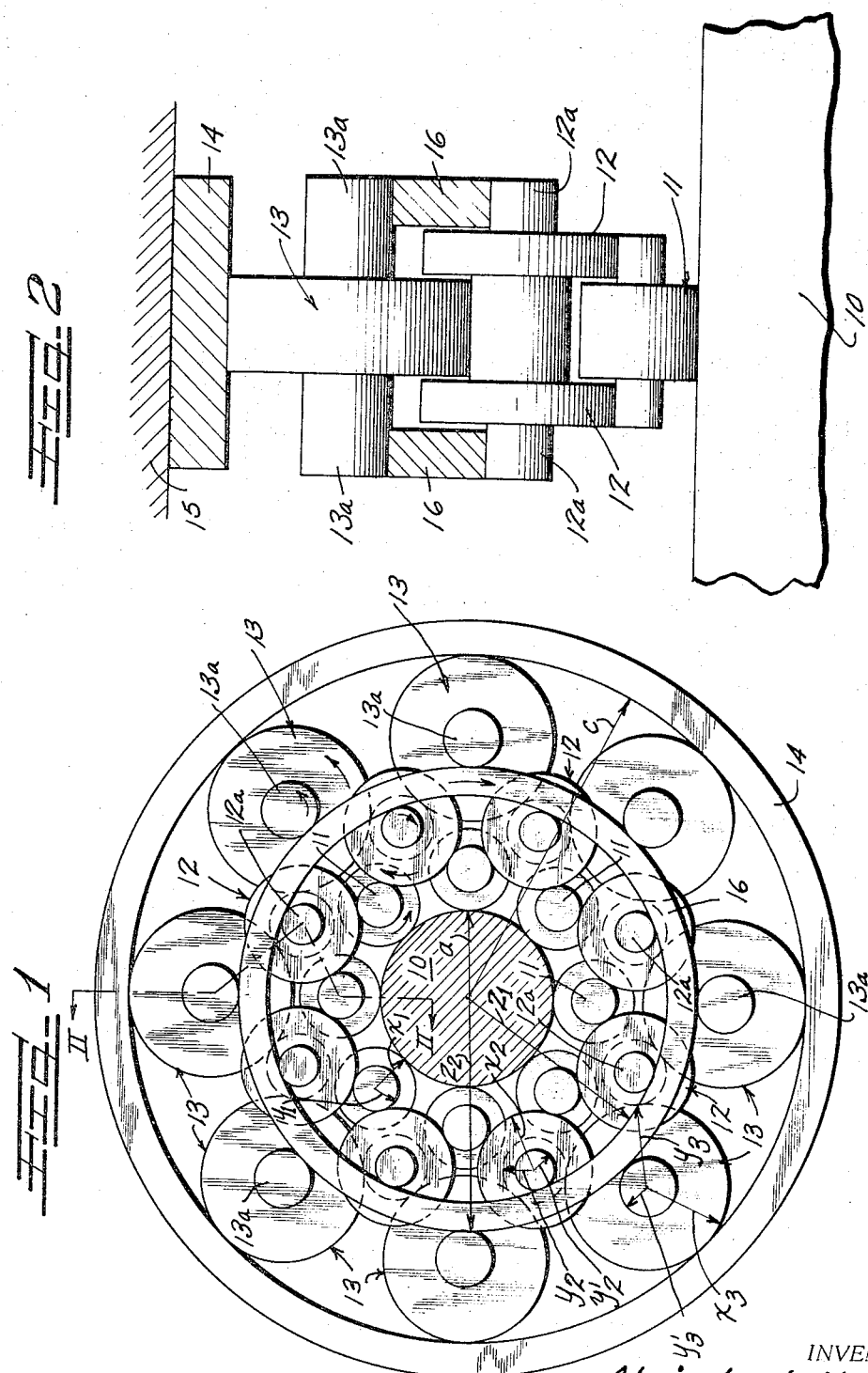
INVENTOR.
*Algirdas L. Nasvytis*
BY *Hill, Sherman, Meroni, Gross & Simpson* ATTORNEYS

United States Patent Office 3,365,254
Patented Jan. 23, 1968

3,365,254
MULTI-ROLLER HIGH SPEED BEARING
Algirdas L. Nasvytis, Cleveland, Ohio, assignor to
TRW Inc., a corporation of Ohio
Filed July 29, 1965, Ser. No. 475,780
3 Claims. (Cl. 308—206)

ABSTRACT OF THE DISCLOSURE

A high-speed bearing system employing three rows of planetary rollers interconnected with each other in a stabilized manner by annular stability rings simultaneously contacting all of the individual rollers of both of two rows of planets in pure rolling contact thereby limiting movement of the contacted rollers to peripheral movement without radial movement.

The present invention relates to roller bearings and is, more particularly, concerned with the provision of roller bearings capable of speeds much greater than the speeds available in conventional roller bearing design.

In my prior application, Ser. No. 368,595, filed May 19, 1964, I have described a very high speed anti-friction bearing construction. The present invention is a further refined version of the high speed bearing configuration set forth and claimed in my above-identified prior application and provides improved bearing stability in a multi-row, high speed bearing. This stability is provided without substantially increasing friction losses, and more particularly, provides an improved roller bearing configuration in which all of the rows of bearing rollers move with solely rolling friction.

As fully set forth in my above-mentioned earlier application, I have shown it to be possible to provide an extremely high speed roller bearing construction which employs a multiple number of rows of rollers partaking of a planetary action about the supported shaft. As explained in the above application, however, the utilization of a multiple number of rows of planetating rollers may provide an instability under high speeds and under loaded conditions. This instability may be eliminated by requiring the rollers of one or more of the rows of planetating rollers members to assume positions peripherally fixed relative to one another. This fixed relative positioning may be accomplished in various ways as described in my earlier application and is particularly effectively and efficiently accomplished in accordance with the present invention.

In accordance with the present invention, a shaft to be supported is positioned concentrically with an internally facing ring member. Between the shaft and the ring member a plurality of rows of planet friction rollers are provided. Preferably, the device employs three rows of planetating roller members. Stub axle members extend from the ends of two adjacent rows of rollers and simultaneously co-operate with an annular stability ring which rotates about the center of rotation of the main shaft. The ring firmly prevents relative radial or peripheral movement between the rollers of the two adjacent rows of rollers. The ring is in rolling contact with the axle members, above described, and, accordingly, provides its location stability completely without the use of fixed bearings. As a result, the device of the present invention constitutes a pure roller bearing with no sliding-friction control element such as is ordinarily employed in standard roller bearings.

It is, accordingly, an object of the present invention to provide an improved, inherently stable, multiple row, high speed bearing construction.

Another object of the invention is to provide an extremely stable high speed bearing incorporating pure rolling friction and without sliding friction.

A feature of the invention is the provision of a rotating annular ring in rolling contact with a pair of adjacent planetating rows of rollsr in a high speed bearing installation.

Still another feature of the invention resides in the provision of multiple rows of planetary roller elements in combination with a pair of annular positioning rings in roller bearing contact with two adjacent rows of rollers.

Still other and further objects and features of the present invention will at once become apparent to those skilled in the art from a consideration of the attached drawing, wherein a preferred embodiment of the invention is shown by way of illustration only, and wherein:

FIGURE 1 is an end-elevational view, in partial cross-section, of a high speed bearing constructed in accordance with the principles of the present invention; and FIGURE 2 is an enlarged partial cross-sectional view taken along the line II—II of FIGURE 1.

As shown on the drawing:

As above described, the present invention relates to bearings designed for the rotational support of a line shaft, or the like. As shown in FIGURE 1, such a shaft 10 is mounted for rotation within an outer bearing race 14. Three rows of roller bearing members, indicated at 11, 12 and 13 are provided, each with eight rollers, and in the preferred form of the invention, the ring 14 is fixedly secured in a housing support which may take any conventional form and is shown in FIGURE 2 schematically at 15.

As has been fully described in my above-identified earlier application, the ratio of the speed of rotation of the shaft 10 and of the rotating planets (moving as a group about the shaft 10) is $$R = \frac{cx_1x_2x_3}{ay_1y_2y_3} + 1$$

where $c$ is the radius of the ring member 14, $a$ is the radius of the shaft 10, $x_1x_2x_3$ are the diameters of the respective rollers 11, 12 and 13 in contact with the shaft 10 or the next preceding driving surface, and $y_1y_2y_3$ are the respective output surface radii of the respective rollers 11, 12 and 13. Under these circumstances, the ratio may well attain a value in excess of 100. Accordingly, it is quite practical for the attainment of a shaft speed of 300,000 r.p.m. at shaft 10 with a cluster speed of the rollers 11, 12 and 13 of 3,000 r.p.m. about the axis of shaft 10. Such cluster speeds are well within reasonable bearing speeds and as a result of this arrangement, I have been able to satisfactorily support rotating shafts operating at speeds in excess of 300,000 r.p.m.

It is necessary, however, to provide stability for the planetating members 11, 12 and 13. As pointed out in my earlier specification, Ser. No. 368,595, such stability may be achieved by providing fixed bearings for one row of rollers, such as for example the row of rollers 13. I have now determined from the construction of bearing devices that a particularly effective stabilizing system may be provided by utilizing annular stabilizing rings 16. These rings, shown in FIGURES 1 and 2, co-operate with projecting stud axles 12a and 13a of respective rollers 12 and 13. Since, as may be seen from FIGURE 1, the direction of rotation of rollers 12 is clockwise, while the direction of rotation of rollers 13 is counterclockwise, a clockwise rotation of the ring 16 results, with pure rolling contact between the ring 16 and the rollers 12 and 13. With the radius of the stub axle 12a being designated $y_2^1$ and the radius of stub axle 13a being designated $y_3^1$ conditions for pure rolling contact may be satisfied by the formula $$\frac{z_1}{z_2} = \frac{y_2^1 x_3}{y_3^1 y_2}$$

where $z_1$ is the radius of the inside surface of the stability ring 16 and $z_2$ is the radius of the outside surface of the stability ring 16. This is derived from the fact that $$y_2^1 n_2 = n_r z_1$$

and $$y_3^1 \frac{n_2 y_2}{x_3} = n_r z_2$$

considering $n_2$ to be the rotation, in r.p.m., of the row of rollers 12 and $n_r$ to be the rotational speed, in r.p.m., of the stability ring 16.

I have found that by thus employing the stability ring 16 in pure rolling contact drive relation with two rows of rollers, for example the second and third rows as illustrated in FIGURES 1 and 2, substantially complete stability of the system is provided. It is impossible, under heavy loads, or otherwise, for the stability rings 16 to rotate eccentrically of the axis of the shaft 10 or for the rollers 12 and 13 to assume any different relative positions during operation of the system. In these circumstances, essentially complete stability is provided and at the same time no deleterious sliding friction is introduced into the system. It will be understood, of course, that the stability rings 16 may be employed between any two adjacent rows of rollers to provide the stability required. However, it is ordinarily preferred that the ring be provided between the last two rows of rollers to minimize its rotational speed.

It will be seen from the above that I have provided an improved and substantially refined, high stability system for extremely high speed bearings. Variations may, of course, be used. For example, but not by way of limitation, the shaft 10 may be fixed as a support and the housing 15 rotated. Other variations may also be made in the construction specifically illustrated, in accordance with the principles discussed, and it is, accordingly, my intention that the scope of the invention be limited solely by that of the hereinafter appended claims.

I claim as my invention:

1. A high speed roller bearing for providing high speed rotational support between shaft and housing members rotatable relative to each other comprising a radially outwardly facing bearing race surface on said shaft, a bearing race surface on said housing, three radially spaced sets of planet rollers in torque-free support engagement between said race surfaces, and means for maintaining the rollers of said sets in fixed relative peripheral radial position and comprising an annular free-wheeling stability ring having its inwardly facing surface in supporting engagement with radially outwardly facing surfaces of one of said rows of rollers and having its radially outermost surface simultaneously in contact with the radially inwardly facing surfaces of a second row of said rollers, the ratio of the inside diameter of said annular ring to the outside diameter of said annular ring equalling $$\frac{y_2^1 x_3}{y_3^1 y_2}$$

where $y_2^1$ is the radius of the rollers contacting the inside surface of the ring, $y_3^1$ is the radius of the rollers contacting the inside surface of the ring and in contact with and driving the row of rollers contacting the outside surface of said ring, and $x_3$ is the radius of the surface of the rollers contacting the outside surface of the ring and in contact with the roller surface having a radius $y_2$, whereby the stability ring has pure rolling contact with the rollers with which it is in contact.

2. A high speed roller bearing construction in accordance with claim 1 wherein at least one of said sets of planet rollers has compound diameters effecting a ratio increase.

3. A high speed roller bearing in accordance with claim 1 wherein a pair of said annular free-wheeling stability ring members is provided, the rings of said pair being positioned on axially opposite ends of said rows of contacted rollers.

References Cited

UNITED STATES PATENTS 1,505,311   8/1934   Callaghan _____ 308—206

FOREIGN PATENTS 90,484   5/1895   Germany.

MARTIN P. SCHWADRON, *Primary Examiner.*

FRANK SUSKO, *Examiner.*